United States Patent [19]

Smart

[11] Patent Number: 5,370,151

[45] Date of Patent: Dec. 6, 1994

[54] SAFETY VALVE

[75] Inventor: Larry W. Smart, Winnfield, La.

[73] Assignee: Dresser Industries Inc., Dallas, Tex.

[21] Appl. No.: 216,927

[22] Filed: Mar. 23, 1994

[51] Int. Cl.$^5$ .............................. F16K 17/08
[52] U.S. Cl. ..................... 137/468; 137/469
[58] Field of Search ............ 137/468, 469, 478, 536, 137/542

[56] References Cited

U.S. PATENT DOCUMENTS

| | | | |
|---|---|---|---|
| 733,641 | 11/1904 | Hayden | 137/477 X |
| 2,264,656 | 12/1941 | Briscoe et al. | 137/536 |
| 3,433,250 | 3/1969 | Hagihara | 137/469 |
| 4,708,164 | 11/1987 | Scallan | 137/476 |
| 4,858,642 | 8/1989 | Fain, Jr. | 137/474 |
| 5,011,116 | 4/1991 | Alberts et al. | 137/469 X |
| 5,234,023 | 8/1993 | Lai | 137/489 |

OTHER PUBLICATIONS

Bulletin SV-7 1555, 1556 and 1557 Cast Steel Safety Valves published Jul. 1986 by Industrial Valve Operation, Dresser Valve and Controls Division.

Primary Examiner—Stephen M. Hepperle
Attorney, Agent, or Firm—Johnson & Wortley

[57] ABSTRACT

A safety valve for releasing excessive fluid pressure from a pressure vessel including a valve body having an inlet and an outlet, a seat bushing connected into the inlet defining an inlet flow passage, a valve seat on the inward end of the seat bushing, a valve disc having a seat thereon movably mounted in the valve body for opening and closing the valve, a spring coupled with the valve disc for biasing the valve disc toward a closed position. The valve disc includes a convex end portion to reduce turbulence during flow into the valve to permit improved seating of the valve disc and an external annular recess defining an annular lip on the valve disc including a seat having a frustoconical seat surface, the lip being flexible to improve the disc seat contact with the seat around the valve inlet to increase the seat tightness of the valve.

5 Claims, 4 Drawing Sheets

SCALE - 5   PRESSURE: 0 PSI   TEMPERATURE: 70 F

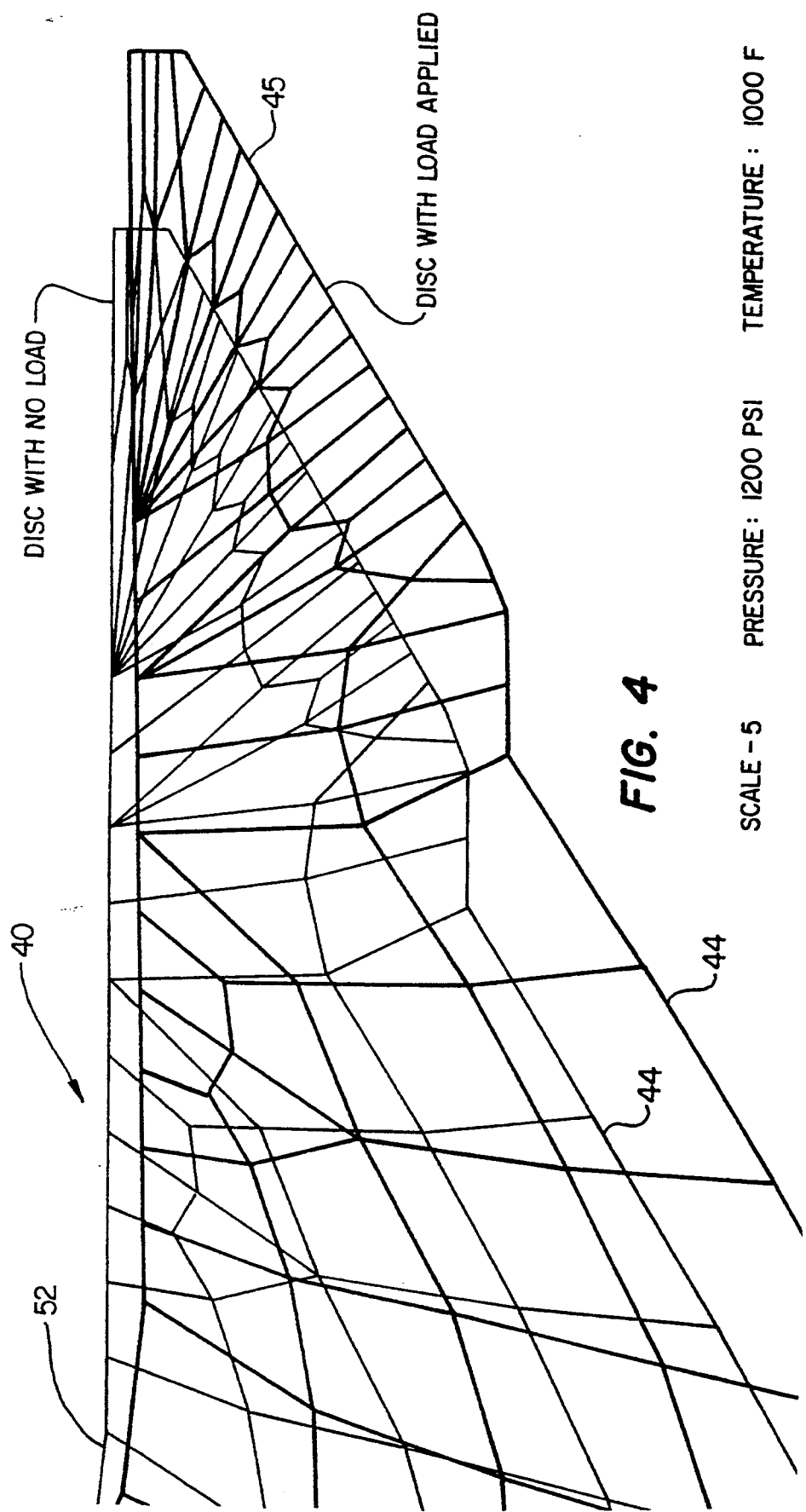

SAFETY VALVE

BACKGROUND OF THE INVENTION

This invention relates to safety valves for relieving excessive pressure in fluid systems to avoid equipment damage and personal injury. More specifically, this invention relates to an improved valve disc and a safety valve employing the disc to improve valve seat tightness in certain similar contemporary safety valve designs.

Pressure relief or safety valves are employed in operating systems for generating, controlling, and utilizing fluids such as saturated and superheated steam. Typical of such safety valves is a huddling chamber type of valve which has been marketed for a number of years. Such valves include a nozzle for admitting steam into the valve from a pressure vessel. A valve seat is formed on the discharge end of the nozzle in a chamber of the main body of the valve. The nozzle is closed to prevent steam escape by a valve member generally referred to as a "valve disc" which is movable relative to the nozzle seat and biased to a closed position on the seat by a compression spring. When the steam pressure in the vessel exceeds a predetermined value, the valve disc is forced from the nozzle seat to admit steam from the pressure vessel into the valve chamber from which the steam flows through an outlet leading from the chamber. When the pressure in the vessel drops to a predetermined level the compression spring forces the valve disc back on the nozzle seat closing the safety valve. The difference between the pressure at which the valve opens and the pressure at which the valve recloses is often referred to as "blowdown". The ratio of the pressure at which the valve begins to leak or simmer to the opening pressure of the valve is referred to as "seat tightness". For example, a valve having a set opening pressure of 500 psi which starts to simmer or leak at 480 psi has a seat tightness of 96%.

Valves of the general type of the present invention are illustrated and described in the following United States Patents: U.S. Pat. No. 4,708,164 for SAFETY RELIEF VALVE, issued to David J. Scallan, Nov. 24, 1987; U.S. Pat. No. 4,858,642 for IMPACT RESISTANT PRESSURE RELIEF VALVE, issued to John E. Fain, Jr., Aug. 22, 1989; and U.S. Pat. No. 5,234,023 for PRESSURE RELIEF VALVE WITH AUXILIARY LOADING DEVICE, issued to Ying-San Lai, Aug. 10, 1993. More specifically, valves of the type of the present invention are 1500 SERIES SAFETY VALVES manufactured and marketed by Dresser Industries, Industrial Valve Operation, Dresser Valve and Controls Division, and described and illustrated in Bulletin SV-7. published by Dresser Industries in July, 1986. The 1500 SERIES VALVES utilizes a THERMOFLEX valve disc.

SUMMARY OF THE INVENTION

It is a principal object of the present invention to provide a new and improved safety valve for relieving excessive fluid pressure.

It is still further object of the invention to provide a safety valve including a valve disc which provides improved seat tightness.

It is another object of the invention to provide a safety valve disc configured to reduce turbulence below the disc as the valve closes to maintain improved centering of the disc and more even seating of the disc on the seat bushing.

It is another object of the invention to provide a safety valve disc having a seat formed on a lip which flexes with pressure changes to maintain substantially constant contact area between the disc and the valve seat on the nozzle during pressure and temperature changes.

It is another object of the invention to provide a safety valve disc and safety valve utilizing such disc which may be used for all fluid applications.

In accordance with an exemplary preferred embodiment of the invention, there is provided a safety valve for use at elevated levels of temperature and pressure which includes a valve disc having a seat portion defined by an external angular frustoconical seat circumscribing a convex end surface and an external annular groove around the disc defining an external annular flexible lip on which the seat is formed whereby the seat flexes responsive to pressure and temperature changes and a frustoconical annular seat surface on the seat bushing of the valve around the inlet nozzle opening into the valve body for engagement by the seat on the valve disc to close the valve.

BRIEF DESCRIPTION OF THE DRAWINGS

FIG. 4 is an enlarged schematic fragmentary view of the valve disc lip under no load and spring load conditions at substantially 1200 psi operating pressure and 1000° F. operating temperature.

DETAILED DESCRIPTION OF A PREFERRED EXEMPLARY EMBODIMENT OF THE INVENTION

Figure 1:
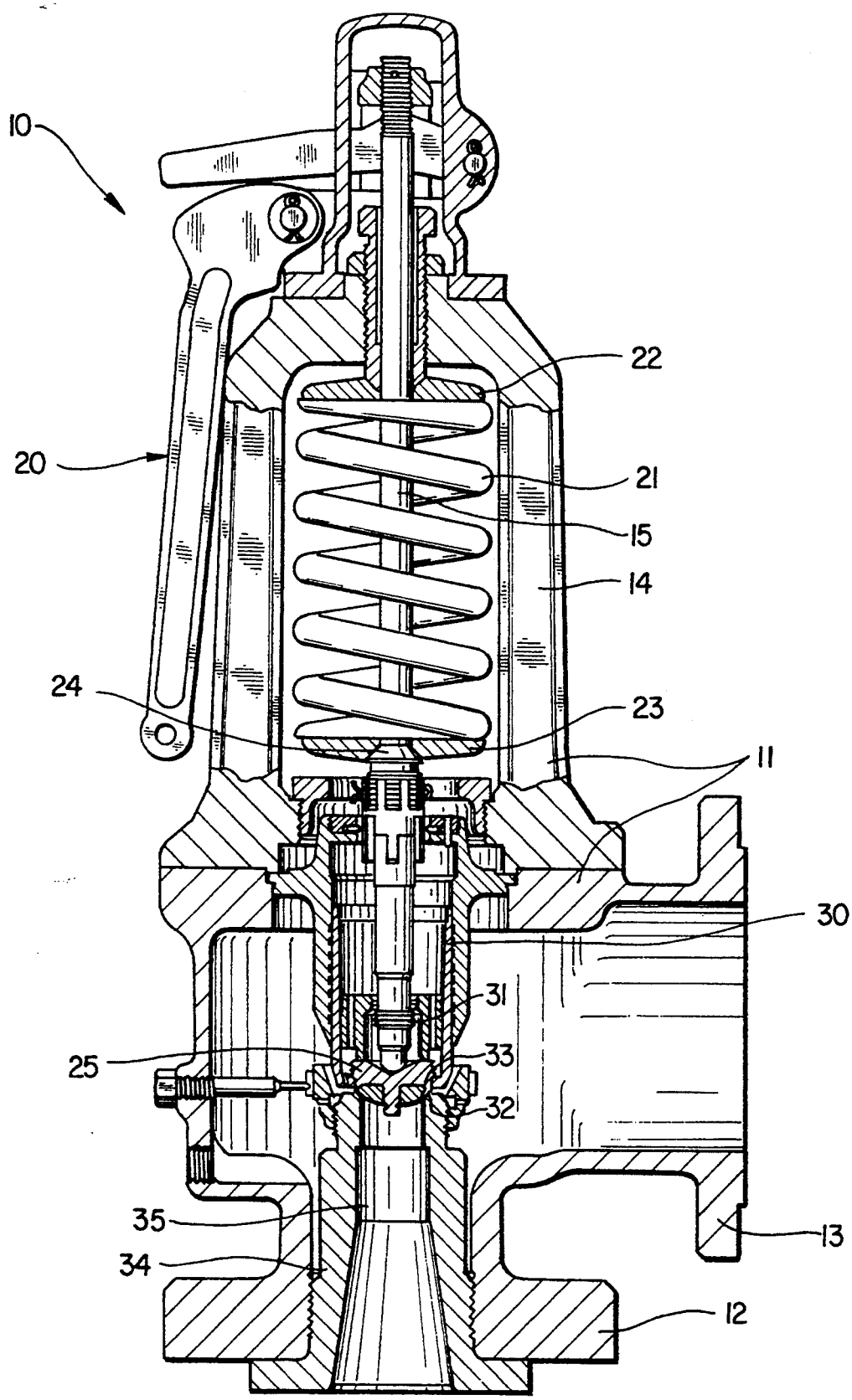
FIG. 1 is a side view in section and elevation of a prior art huddling chamber type safety valve of the type to which the present invention applies.

Referring to FIG. 1, a typical prior art safety valve 10 to which the invention applies includes a valve body 11 having flanged inlet and outlet connections 12 and 13. An open yoke 14 is mounted on the valve body supporting a valve stem 15 manually operable by a lift assembly 20. A precision wound coil spring 21 is mounted on the valve stem within the yoke compressed between spring stops 22 and 23. The lower spring stop 23 is engageable with an external conical boss 24 formed on the valve stem. A valve disc 25 is mounted on the lower end of the valve stem within a mounting tube guide or disc holder 30 held by a disc nut 31. The valve disc 25 has a downwardly and inwardly sloping annular lip 32 defining a 45° seat which is engageable with a 45° seat 33 on a seat bushing 34 mounting in the inlet connection 12 defining an inlet flow passage 35 leading into the safety valve.

In operation, the prior art safety valve 10 is mounted on a pressure vessel, not shown, for the purpose of relieving excessive fluid pressure which may develop in the pressure vessel. The fluid pressure in the vessel is communicated to the safety valve through the flow passage 35 in the seat bushing 34 of the valve. The safety valve is held closed by the compressed spring 21 which urges the valve disc 25 into sealing engagement with the seat 33 on the seat bushing 34. As the pressure in the pressure vessel increases to the set pressure of the safety valve, a pressure level is reached below the set pressure at which the valve begins to leak preliminary to fully opening at the set pressure. This pressure level at which the valve begins to leak defines in relation to the opening pressure what is known as "seat tightness". Typically, the seat tightness of a prior art safety valve as illustrated may be 94%, which means that the valve will begin to leak when the pressure in the vessel reaches 94% of the set pressure of the safety valve. As valve leakage begins, the valve disc 25 is lifted by the fluid pressure from the seat 33 permitting flow from the flow passage 35 around the valve disc within the seat 33 into the outlet 13 of the safety valve. As the fluid pressure in the pressure vessel decreases due to the release of the pressure by the safety valve, the pressure decreases to a reseating pressure for the valve at which the valve disc is again urged onto the seat 33 reclosing the valve. The pressure reduction between the set pressure of the valve and the reseating pressure is termed the blowdown differential, or more briefly stated, the "blowdown" of the valve.

Figure 2:
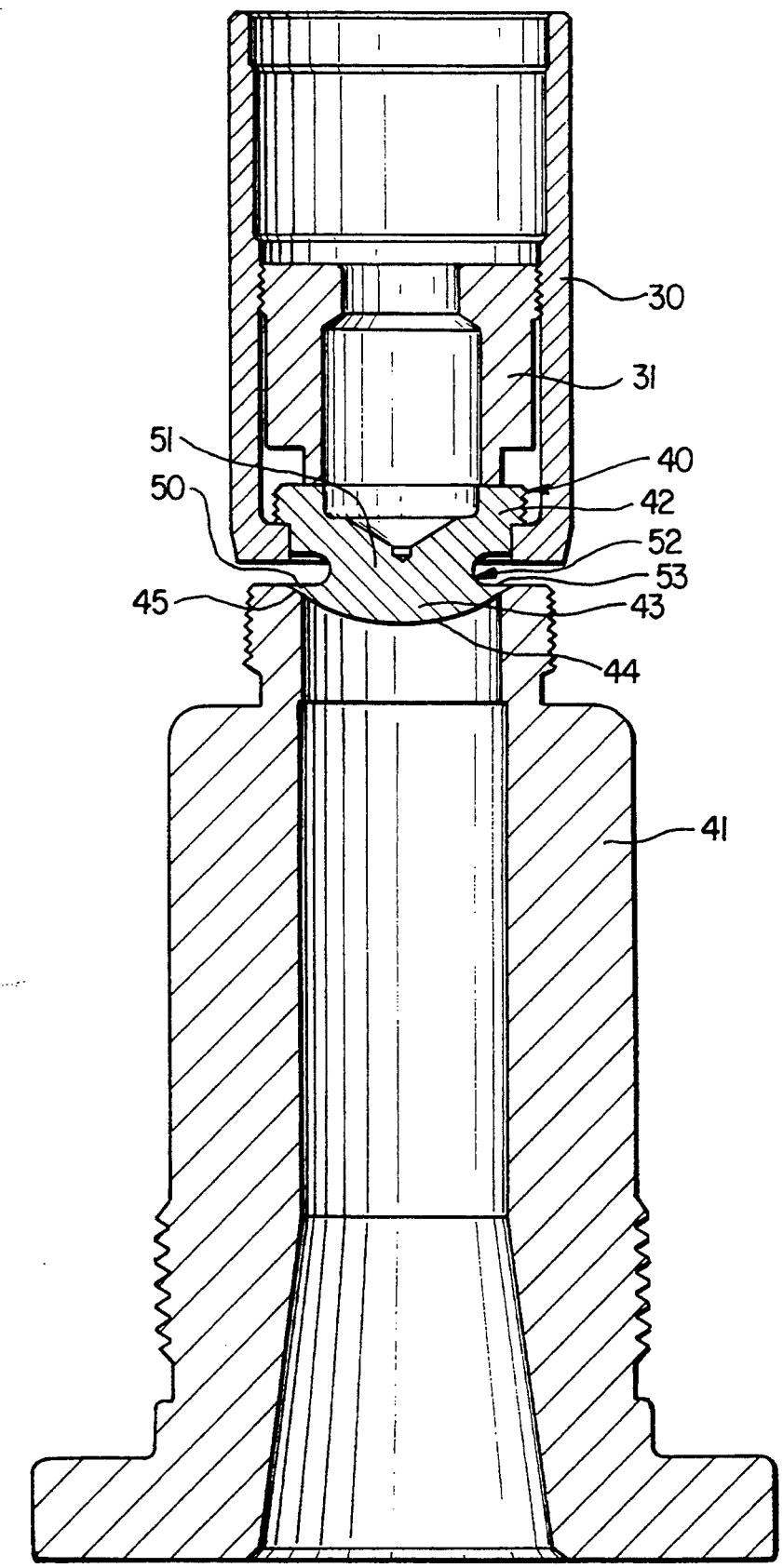
FIG. 2 is a longitudinal schematic view in section illustrating the application of a preferred exemplary embodiment of the invention to a safety valve of the type illustrated in FIG. 1.

In accordance with the invention, a preferred exemplary embodiment of a modified form of the safety valve 10 is illustrated schematically in FIG. 2. Referring to FIG. 2, the valve disc 25 of the prior art valve 10 shown in FIG. 1 is replaced by a valve disc 40 and a seat bushing 41 including the features of the invention. The remaining components of the safety valve 10 are as illustrated in FIG. 1.

Figure 3:
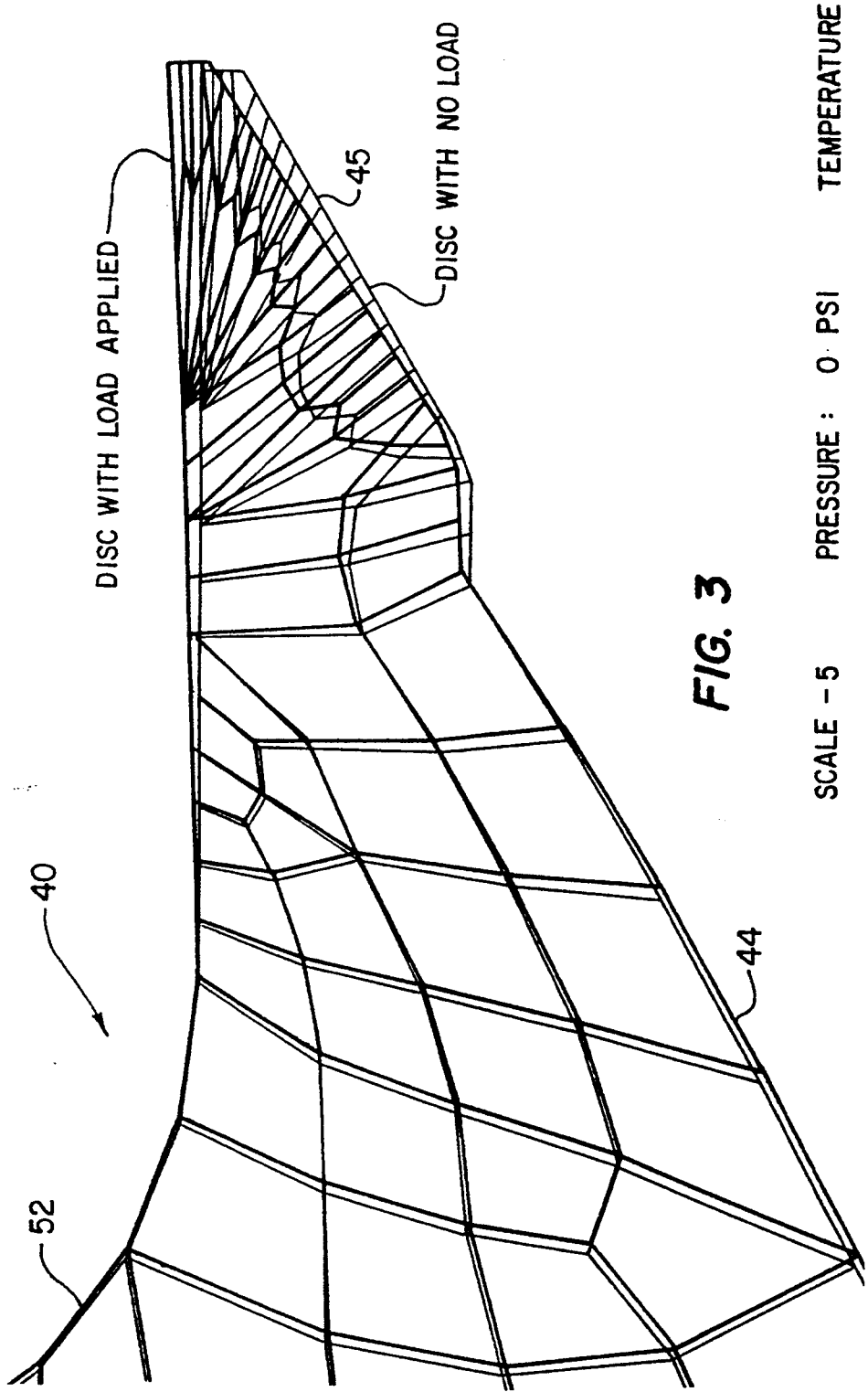
FIG. 3 is an enlarged fragmentary schematic view in section of the peripheral valve seat portion of the valve disc of the invention showing the valve disc lip under no load and spring load conditions when not under operating pressure and at substantially 70° F.

Referring to FIGS. 2-4, the valve disc 40 has a first coupling end portion 42 which is engageable by and clamped between the disc holder 30 and the disc nut 31 locking the valve disc in operating position in the safety valve. The valve disc 40 has a second valve seat end portion 43 defined by a convex end surface 44 and an annular downwardly and inwardly sloping frustoconical seat surface 45 on an external annular flexible lip 50. A central body portion 51 of the valve disc 40 is provided with an external annular groove or recess 52 which circumscribes the valve disc body on the opposite side of the lip 50 whereby the lip 50 is a flexible feature of the valve disc. The seat surface 45 on the valve disc is engageable with a frustoconical seat surface 53 provided on a first end portion of the seat bushing 41 for shutting off flow through the seat bushing and flow passage 35 when the safety valve is closed. In the example of the valve of the invention illustrated, the angles of the seat surfaces 45 and 53 are substantially 60° measured from a vertical axis through the disc and seat bushing as oriented in FIGS. 2-4. It is to be understood, however, that the seat angles are not critical. The flexible lip 50 of the valve disc 40 on which the seat surface 45 is formed, in accordance with the invention, permits the seat surface to flex with changes in operating forces and temperatures of the safety valve to maintain maximum contact between the valve disc seat surface and the seat bushing seat surface.

OPERATION OF THE PREFERRED EXEMPLARY EMBODIMENT

The safety valve 10 is mounted on a pressure vessel using an appropriate fitting, not shown, with the fluid to be controlled directed into the inlet flow passage of the seat bushing 41. The force of the coil spring 21 applied through the valve stem 15 holds the valve disc 40 against the seat bushing 41 with the valve disc seat surface 45 engaging the seat bushing seat surface 53 to prevent flow of fluid from the pressure vessel outwardly through the safety valve until the fluid pressure reaches the pressure at which the safety valve is set to open. FIG. 2 illustrates the valve disc 40 at the closed position. Referring to FIG. 3, the periphery of the valve disc 40 is graphically illustrated under conditions of no pressure and ambient temperature of approximately 70° F. The lower image of the disc shows the position of the lip 50 with the seat 45 prior to applying the load of spring 21 to the disc. When loaded by the force of the coil spring, the outer periphery of the disc including the lip and seat flex upwardly as shown. Thereafter, as illustrated in the graphic representations of the disc in FIG. 4 under operating conditions of 1200 psi and a temperature of 1000° F., the load of the coil spring on the top of the disc and the fluid pressure load on the bottom of the disc and the temperature expands the disc radially and deforms the disc lip and seat downwardly as shown. During the increases in temperature and pressure along with the spring load on the disc holding the valve closed, the flexibility of the disc lip produces substantially constant uniform contact area between the disc seat and the seat on the seat bushing. As the pressure increases toward the set pressure for the opening of the safety valve, at a pressure level of substantially 97-98% of the set pressure for the valve, the valve disc will begin to move upwardly against the force of the spring with the valve beginning to leak and then moving to a full open position at which the valve will release the pressure in the vessel to lower the pressure until the blowdown differential is reached at which the valve disc reseats closing the valve.

A particular advantage of the valve of the present invention is the increase of the seat tightness as previously discussed from about 94% to the range of 97-98%. The spherical end surface 45 of the valve disc tends to evenly distribute the flow of fluids from the pressure vessel around the valve disc toward the outlet of the valve producing a centering effect upon the valve disc with a reduction in turbulence below the valve disc resulting in more even seating of the disc back on the seat bushing as the valve closes.

While the safety valve of the invention has been described and illustrated by way of a preferred exemplary embodiment, it is to be understood that further changes and modifications may be made in the safety valve and valve disc without departing from the scope of the invention as set out in the appended claims.

What is claimed:

1. In a safety valve including a hollow valve body having a fluid inlet and a fluid outlet, a seat bushing mounted in the fluid inlet defining an inlet nozzle opening into the valve body, a guide sleeve mounted in the body on an axis coincident with the axis of the seat bushing, a valve disc holder mounted in the guide sleeve for movement relative to the seat bushing to open and close the valve, a valve disc secured in the valve disc holder moveable with the valve disc holder relative to the seat bushing, and a valve disc nut secured in the valve disc holder locking the valve disc in the valve disc holder, the improvement comprising:

the valve disc having a central body, a first coupling end portion for connection of the valve disc with the valve disc holder and a second opposite end seat portion defined by an external annular frustoconical seat circumscribing the second end portion facing away from the central body, a convex end surface on the second end portion within the seat and projecting endwardly beyond the seat, and an external annular groove around the central body and second end portion defining an external annular flexible lip on which the seat is formed; and a frustoconical annular seat surface on the seat bushing around the inlet nozzle opening for engagement by the seat on the valve disc to close the valve.

2. A safety valve according to claim 1 where the annular lip on the valve disc flexes during pressure and temperature changes to maintain a substantially constant contact area between the seat on the valve disc and the seat on the seat bushing.

3. A safety valve according to claim 2 where the valve disc includes an external annular coupling recess around the central body for connection of the disc with the disc holder.

4. A safety valve according to claim 3 where the convex surface on the valve disc is shaped to a curvature to equalize fluid flow exiting from the nozzle opening to maintain the disc centered and permit even reseating of the valve disc on the seat bushing.

5. A valve disc for use in a safety valve comprising: a central body having a first coupling end portion for connection of the disc with a disc holder in the safety valve and a second opposite end seat portion defined by an external annular frustoconical seat circumscribing the first end portion facing away from the central body, a convex end surface on the second end portion within the frustoconical seat and projecting endwardly beyond the frustoconical seat, and an external annular groove around the central body portion and second end portion defining an external annular flexible lip around the second end portion, the flexible lip deforming responsive to pressure and temperature changes of the valve disc to maintain substantially constant contact between the frustoconical seat on the valve disc and a corresponding seat within the safety valve when the valve disc is at a closed position in the safety valve.

* * * * *